United States Patent
Brewer et al.

(10) Patent No.: US 7,676,438 B2
(45) Date of Patent: Mar. 9, 2010

(54) PERSONAL DIGITAL ASSISTANT AS SMART CARD

(75) Inventors: Thomas G. Brewer, Lexington, SC (US); Nelson H. Yount, Lexington, SC (US)

(73) Assignee: NCR Corporation, Dayton, OH (US)

( * ) Notice: Subject to any disclaimer, the term of this patent is extended or adjusted under 35 U.S.C. 154(b) by 375 days.

(21) Appl. No.: 11/213,277

(22) Filed: Aug. 26, 2005

(65) Prior Publication Data

US 2007/0274569 A1   Nov. 29, 2007

(51) Int. Cl.
  *G06Q 40/00* (2006.01)
(52) U.S. Cl. ...................................................... 705/64
(58) Field of Classification Search ............. 705/42–44, 705/64–68, 71–72, 75–76; 713/168–169; 361/679; 707/1–6
  See application file for complete search history.

(56) References Cited

U.S. PATENT DOCUMENTS

| | | | | |
|---|---|---|---|---|
| 5,267,313 A | * | 11/1993 | Hirata | 380/281 |
| 5,500,897 A | * | 3/1996 | Hartman, Jr. | 713/178 |
| 5,748,737 A | * | 5/1998 | Daggar | 705/41 |
| 5,898,779 A | * | 4/1999 | Squilla et al. | 713/176 |
| 6,115,601 A | * | 9/2000 | Ferreira | 455/406 |
| 6,282,522 B1 | * | 8/2001 | Davis et al. | 705/41 |
| 6,574,627 B1 | * | 6/2003 | Bergadano et al. | 707/9 |
| 2002/0110239 A1 | * | 8/2002 | Venkatesan et al. | 380/28 |

FOREIGN PATENT DOCUMENTS

EP   667577 A1 *   8/1995

OTHER PUBLICATIONS

Powell, "Spatial Dependence of Fundamental Properties in the Microwave-Induced Plasma (Atomic, Emission)", DAI-B 45/09, p2898, Mar. 1985, AAT 8427757.*

* cited by examiner

*Primary Examiner*—Mary Cheung
(74) *Attorney, Agent, or Firm*—Gregory A. Welte

(57) ABSTRACT

A system for authenticating a document, D. A trusted party applies an algorithm to D, for example, by treating each byte of data within D as a number, and treating the numbers as inputs to the algorithm. The trusted party obtains a result from the algorithm, termed a Message Authentication Code, MAC. The trusted party gives a courier both (1) D and (2) the MAC, as by loading both into a portable computer carried by the courier. The courier delivers both D and MAC to a recipient, who is equipped with the identical algorithm. The recipient applies the algorithm to D. If the recipient obtains the MAC, the recipient concludes that no tampering of D occurred. The reason is that successful tampering requires the courier to replace MAC with a fabricated MAC(fab). MAC(fab) must possess the characteristic that the algorithm would produce MAC(fab) when applied to the tampered document D. However, since the courier does not know the algorithm, and since the number of possible algorithms is nearly infinite, the courier cannot produce MAC(fab).

12 Claims, 3 Drawing Sheets

PERSONAL DIGITAL ASSISTANT AS SMART CARD

CROSS REFERENCE TO RELATED APPLICATIONS

This application claims priority under 35 U.S.C. §120 to the following commonly-assigned patent application, which is incorporated herein by reference:

Application Ser. No. 09/427,419, entitled "PERSONAL DIGITAL ASSISTANT AS SMART CARD," by Thomas G. Brewer and Nelson H. Yount, filed on Oct. 27, 1999 now abandoned.

FIELD OF THE INVENTION

The invention concerns the use of a Personal Digital Assistant, or PDA, as a smart card.

BACKGROUND OF THE INVENTION

Smart cards are in widespread use. A smart card resembles an ordinary plastic credit card, but having added features which include (1) a high-capacity memory, together with (2) an interface, which allows external equipment to communicate with that memory. In addition, some, or all, of the data stored within a smart card is stored in encrypted form, and some smart cards may be able to perform encryption and decryption of that data.

Smart cards are used by both individuals and industries. An industry may use smart cards, for example, in a manufacturing process. Each product undergoing manufacture, such as an automobile, is equipped with a smart card, which stores data indicating all manufacturing steps previously accomplished, thereby indicating the present state of completion of the product.

Individual persons commonly use smart cards in place of credit cards. For example, a bank provides equipment, such as an Automated Teller Machine (ATM), with which the smart card communicates. When a person who maintains an account with the bank wishes to obtain funds, the person presents a smart card to the ATM. The ATM loads data into the smart card which indicates a monetary amount, and deducts that amount from the account. The person then utilizes the smart card to make purchases of merchandise and services.

When the purchases are made, specialized equipment located at the site of the purchase (1) reads the monetary amount stored within the smart card, (2) determines whether the monetary amount will cover the purchases, and, if so, (3) deducts the amount of the purchase from the stored monetary amount.

As smart cards come into wider usage, more cards will enter circulation. Consequently, on average, the number of cards carried by each person is expected to increase.

It is not necessarily convenient for people to carry large numbers of smart cards.

OBJECTS OF THE INVENTION

An object of the invention is to provide the benefits of multiple smart cards, but eliminating the requirement of physical possession of a multiplicity of smart cards.

An object of the invention is to incorporate the functionality of a smart card into a personal digital assistant.

SUMMARY OF THE INVENTION

In one form of the invention, a portable computer, or Personal Digital Assistant (PDA), carries a digital document. The document contains material with which tampering is prohibited, such as a photograph of a person or a bank balance. The invention implements security measures which indicate whether tampering of the document has occurred. With these measures implemented, a recipient of the document can readily determine the document's authenticity. For example, if the recipient is a security agency controlling access to a building, the agency can admit, or reject, a person seeking entry to the facility, based on the document, which may be a photograph, in this case.

In another form of the invention, the computer, or PDA, carries multiple digital documents.

DETAILED DESCRIPTION OF THE INVENTION

Introduction

The invention utilizes a Personal Digital Assistant, PDA, to implement several functions ordinarily found in smart cards, such as (1) storing data indicating monetary amounts and (2) storing data which identifies the owner of the smart card. Further, in one form of the invention, these implementations are accomplished in software.

That is, many smart cards rely on integrity of hardware to provide security. They physically isolate the electronic circuitry forming the card's memory from the outside world, using a stout housing which provides ready evidence of tampering. A hacker may attempt to physically break into the housing and gain access to the memory. However, such a break-in will be immediately detectable because of visible damage inflicted on the card.

In contrast with this approach to security, one form of the invention makes the stored data freely available to the user, or anyone else who wishes to read it. Mathematical techniques are applied to the data during financial transactions, which detect whether tampering has occurred to the data.

DETAILED DESCRIPTION

Personal Digital Assistant

The Personal Digital Assistant, PDA, will first be described.

The architecture of the Personal Digital Assistant, PDA, shares many features with a modem laptop computer, and both devices perform many of the same functions, although PDA's tend to be smaller in size, while laptops tend to be larger. However, as technology advances, it can be expected that the bulkier components of laptops, such as disc drives, will become miniaturized, so that a complete laptop computer will soon be available in a pocket-sized edition. Ultimately, PDAs and laptops may become indistinguishable in both size and function.

For this reason, the present invention will be framed in terms of the architecture of the standard Personal Computer, PC. However, it is recognized that the invention is preferably implemented today as a PDA, because of the small size of the PDA. One type of PDA utilizes a subset of the components found in a personal computer.

One Form of Invention

Figure 1:
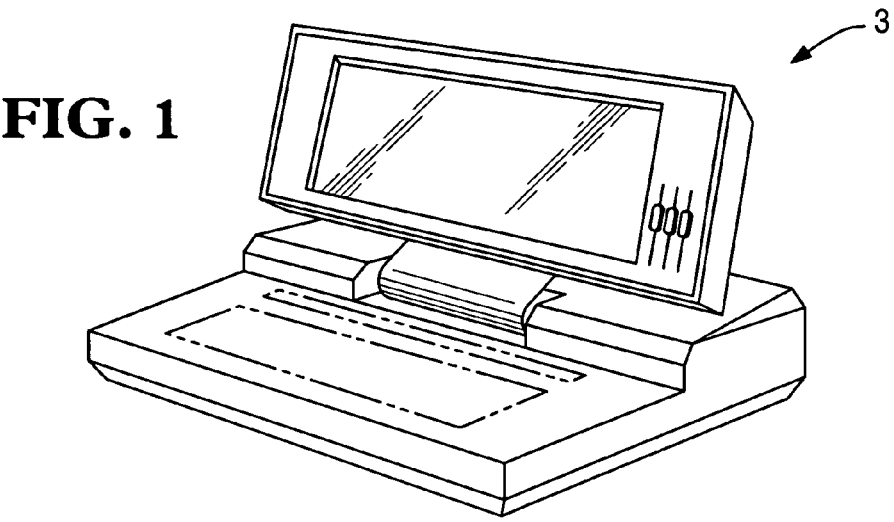
FIG. 1 illustrates a prior-art portable computer.
Figure 2:
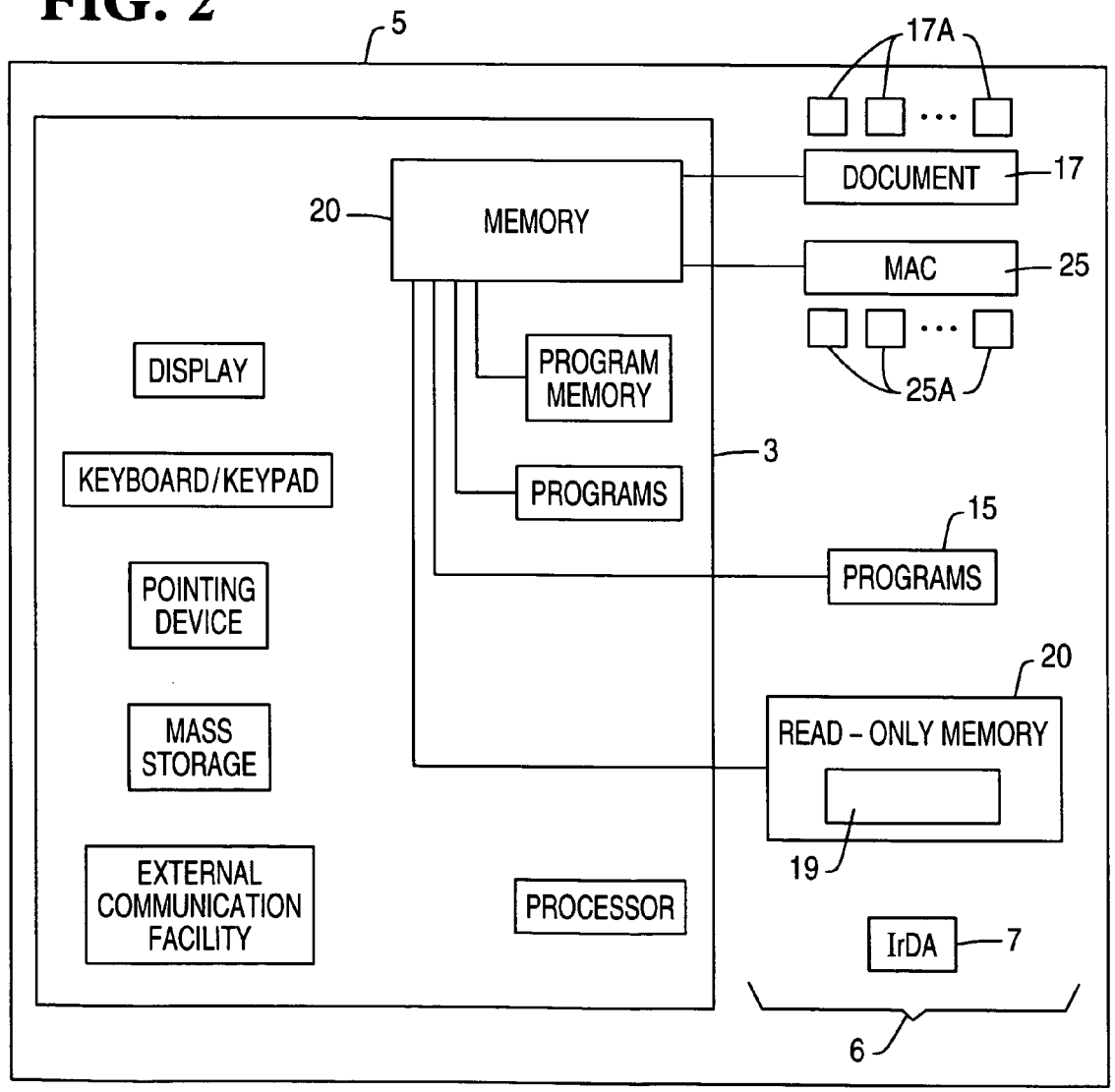
FIG. 2 illustrates one form of the invention.

FIG. 1 illustrates a standard laptop computer 3. FIG. 2 illustrates the computer 3 in schematic form, and lists several of the internal components of the computer 3. In addition, FIG. 2 illustrates one form of the invention 5, including several components 6 which are added to the computer 3. Device 5 will be designated a PDA herein. Various embodiments of the invention utilize different combinations of the added components 6.

The added components include an infra-red communication link 7, which preferably complies with the standard designated IrDA. IrDA is an acronym for Infra-red Developers Association, which is known in the art. This link 7 is used to transfer data to an external device, as explained below.

The invention adds programming, indicated as block 15, which performs the tasks described below, and described in the flow charts illustrated in the drawings.

In this form of the invention, a digital document, indicated as block 17, is stored in memory 20. That document 17 may contain a photograph of the owner of the PDA 5, or other protected information. In this example, the part of memory 20 storing the document 17 is a special type: it cannot be altered. That is, the memory 20 is of the read-only type, so that the document 17 cannot be modified.

Such non-writable memory is commonly used in computers. For example, the BIOS (Basic Input Output System) used in the personal computer is frequently non-writable. As another example, an ordinary readable ROM can be used, but in which the control line which enables the write operation has been disabled.

With this read-only arrangement, the digitized photograph is considered highly secure, and an imposter would be presented with significant difficulty in replacing the digitized photograph contained in memory 20 with the imposter's own photograph.

The imposter may attempt to open the case of the PDA 5, physically extract the memory 20, and replace it with a memory containing the imposter's photograph. This attempt can be thwarted by several expedients. One is to utilize a tamper-proof case, which is tamper-proof in the sense that tampering is not prevented, but is detectable if it occurs. Tamper-proof cases are known in the art.

A second approach is to treat the PDA 5 as a disposable item. The casing of the PDA is manufactured so that it cannot be opened, without visibly destroying part of it. That damage provides visible evidence of tampering. If the PDA malfunctions and requires repair, the PDA is discarded, because repairing would require invasion of the case, which would be interpreted as tampering.

Therefore, in this form of the invention, a secure document is contained within read-only memory located within a PDA or portable computer. That document may contain a photograph of a person.

Second Form of Invention

In another approach, no special memory 20 or hardware is used. Instead, mathematical techniques provide the desired security.

The document 17 is stored within ordinary memory. The document is made available to all parties who wish to obtain, or modify it. However, if modification of the document occurs, that modification will become detectable. The detection is accomplished through the encryption technique known as Message Authentication Coding, MAC, or a similar approach.

A simplified MAC will be described. However, the Inventors emphasize that this description is a simplification, for purposes of illustration. Even though the simple MAC described herein provides high security, actual MACs are much more complex, and provide an extremely high measure of security.

As stated above, the document 17 contains a digitized photograph. As such, the document 17 contains a collection of pixels. For example, the photograph may occupy a full VGA screen of 480×640 pixels, or 307,200 pixels total. Assume that each pixel requires one byte (ie, 8 bits) of data. Each pixel-byte can thus be considered a decimal number ranging from zero (0000 0000 binary) to 255 (1111 1111 binary).

Assume that, for purposes of this explanation, a smaller number of pixels is used, such as 100. Extension to a larger number of pixels is straightforward.

Each of the 100 pixel-bytes is treated as a mathematical variable, labeled from N1 to N100. These variables are treated as the inputs of an equation. A simple equation is the following:

$$MAC = N1 + N2 - N3 - N4 + N5 - \ldots + N99 - N100.$$

In this equation, each variable is given an algebraic sign, and the result, MAC, is the algebraic sum of the signed variables. MAC is the Message Authentication Code discussed above.

While this equation appears simple, if a hacker would attempt to guess the equation, the hacker would be confronted with a large number of possible equations. The number of possible equations is easily calculated. The algebraic sign given to each variable has two possibilities: positive or negative. 100 signs are involved. Consequently, the number of possible equations is $2^{100}$, or 2 raised to the 100 power, which equals about 10 raised to the thirtieth power.

This number of possible equations is enormous. Further, this number corresponds to the simplified case of 100 pixels. If all 307,200 pixels were used in an equation of this type, then the number of possible equations would be 2 raised to the 307,200 power, which is an inconceivably large number.

The large number of possible equations enhances the security of the invention, as will be seen shortly.

The equation given above produces a result, MAC, which is the Message Authorization Code. The MAC 25 is stored within the PDA 5, as indicated in FIG. 2. This MAC 25 can be stored in ordinary memory along with the document 17. The MAC 25 can be read, and altered, by any party.

Figure 3:
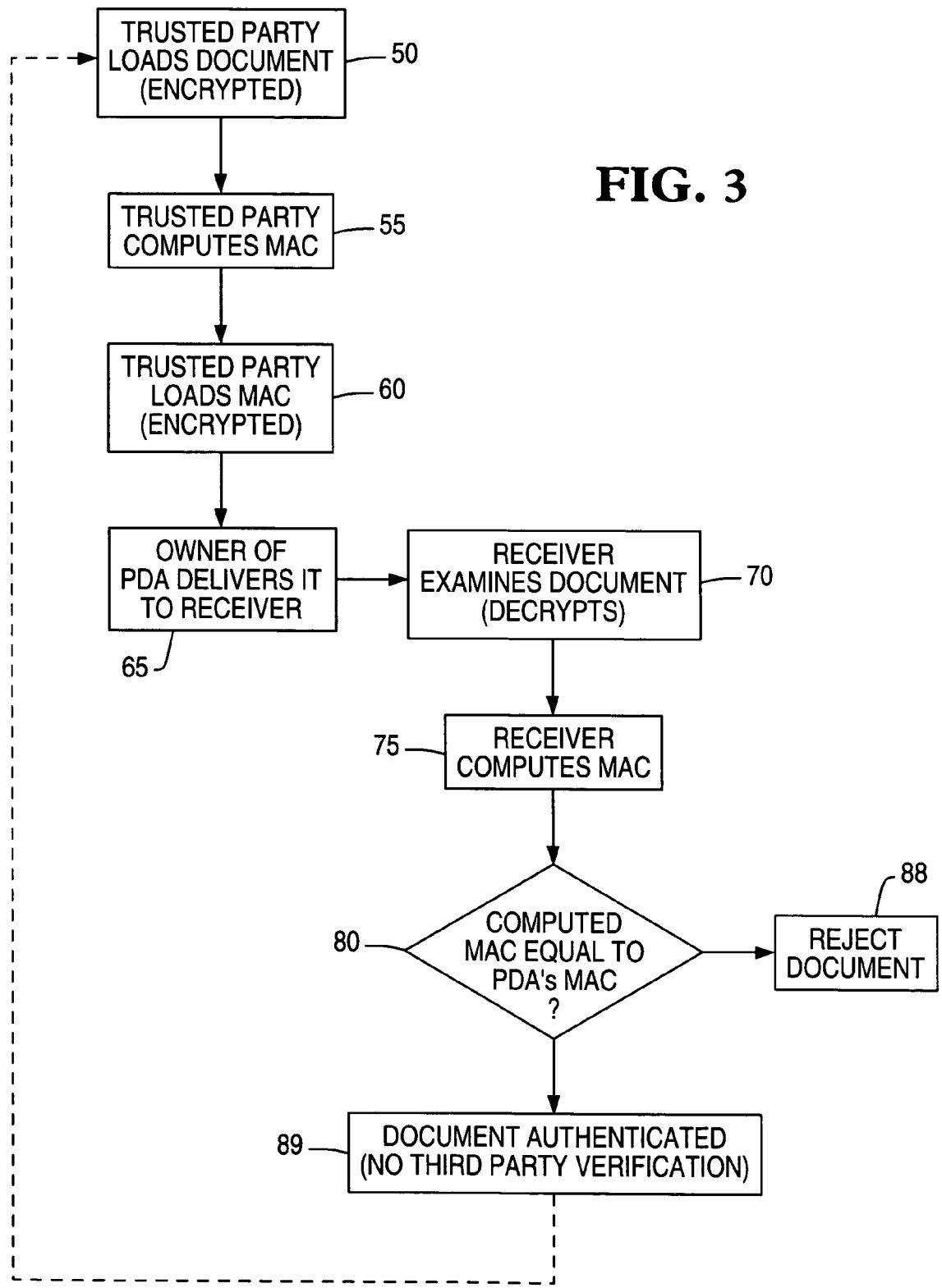
FIG. 3 is a flow chart illustrating logic implemented by one form of the invention.

The operations involved in the steps just described, namely, (1) storing the pixel-data within the PDA, (2) using the equation to compute MAC, and (4) and storing the MAC within the PDA are indicated by blocks 50, 55, and 60 in FIG. 3. These operations are undertaken by a trusted party, such as the operator of the security devices SD, described below.

As stated above, the document and the MAC are stored in ordinary memory. Despite this fact, the invention effectively prevents tampering with the document, as will now be explained.

Figure 4:
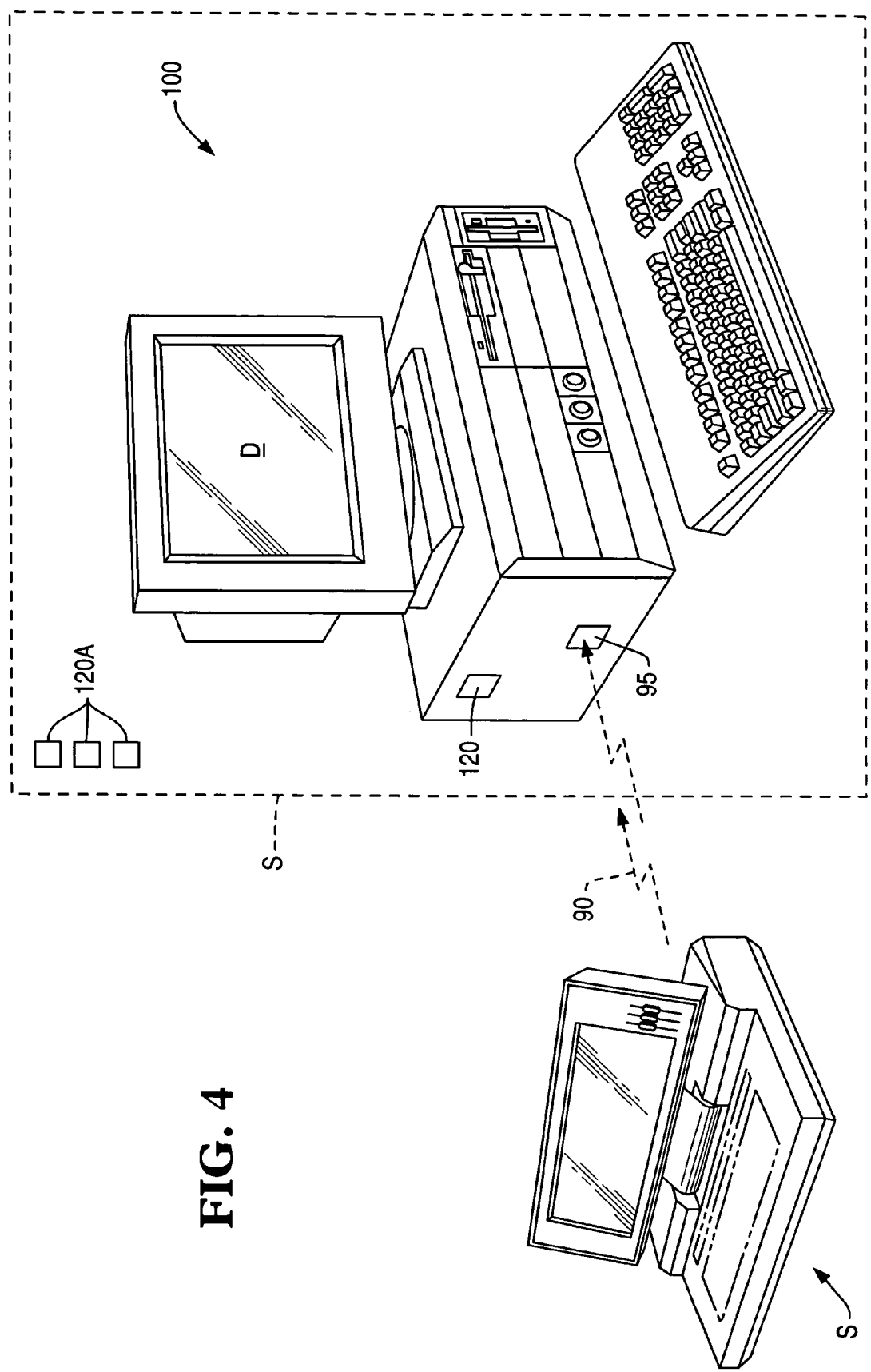
FIG. 4 illustrates interaction between one form of the invention and a security station.

The owner of the PDA 5 in FIG. 2, whose photograph is stored as document 17, carries the PDA 5 to a security station S in FIG. 4. The PDA 5 delivers the document to a receiver 95 contained within a computer 100, as indicated by arrows 90. The infra-red link 7 in FIG. 2 handles the delivery. Block 65 in FIG. 3 represents this step.

The computer 100 takes two actions. One, it generates a photograph using the document, and displays the photograph (not shown) on a display D. A security agent (not shown) compares the photograph with the owner of the PDA 5.

Two, the computer 100 computes MAC, using the document. The computer 100 is able to perform this computation because it is equipped with the equation originally used by the trusted party in block 55 of FIG. 3 to compute MAC. Blocks 70 and 75 in FIG. 3 represent this step.

Decision block 80 inquires whether the computed MAC matches that downloaded from the PDA in block 60. If not, the document is rejected, in block 88. If a match occurs, block 89 indicates that the document is considered as authenticated.

Two features of this operation should be observed. One is that a hacker cannot substitute a document containing the hacker's photograph for the document 17 in FIG. 2. The reason is that the hacker cannot compute a valid MAC, because the hacker does not know the required equation.

That is, even though the hacker knows the inputs to the equation (the pixel-variables contained in the authentic document 17 in FIG. 2), and also knows the output of the equation (MAC in FIG. 2), the hacker does not know the equation itself.

Further, the equation is not derivable from these two known entities (the pixel-variables and the MAC). That is, there is no unique mathematical function relating the authentic pixel-data with the MAC. Restated, of the astronomical number of possible equations described above, a certain group of them will produce the correct MAC. If the hacker chooses one of that group, the hacker can input the pixel-variables of his own photograph to that equation. However, that equation will probably not match the equation used in block 55 of FIG. 3, and will thus produce the wrong MAC. That erroneous MAC will be detected when the hacker attempts to pass the security station S in FIG. 4.

A second feature is that the hacker cannot execute a brute-force attack to ascertain the correct equation. In a brute-force attack generally, a hacker would (1) select an equation, (2) enter data, (3) compute a MAC, and (4) determine whether the MAC is correct. If not, the hacker repeats steps (1) through (4). With modem computers, this repetition can be achieved in a short time.

However, step (4) is not available to the hacker. To execute that step, the hacker must present himself to the security station S. But as soon as an incorrect MAC is delivered to the computer 100, the hacker will become exposed, and the brute-force attack will be foiled.

The previous discussion imposed a simplification, by assuming that plain-text of the pixel-data and MAC are stored. In practice, the pixel-data would be encrypted using a secret key, which is only available to (1) the trusted party of block 50 in FIG. 3 and (2) computer 100 in FIG. 4.

Optionally, the MAC may be encrypted also. The encryption steps are indicated by the parentheticals in blocks 50 and 55 in FIG. 3.

With this arrangement, a hacker's difficulty becomes, in effect, insurmountable. The hacker must first ascertain the secret key, which is a significant problem in itself. Then, the hacker must de-crypt both the encrypted document, and possibly also the encrypted MAC. But, even though the hacker now possesses the key, the hacker does not know the encryption algorithm, and thereby faces another obstacle.

If the hacker obtains the algorithm, the hacker must still guess at the equation used to relate the document with the MAC. Next, the hacker must encrypt the pixel-data for his own photograph, using the secret key, and then compute a MAC, and store both the encrypted pixel-data and the MAC within the PDA.

The inventors submit that these tasks are, as a minimum, extremely difficult, and perhaps impossible.

Sources of MAC Algorithms

As stated previously, this explanation is a simplification, given for the purpose of illustration. In the art of cryptography, Message Authorization Codes, MACs, are highly developed, and are described in the text *Applied Cryptography*, by Bruce Schneier (John Wiley & Sons, New York, 1996, ISBN 0 471 12845 7). This text is hereby incorporated by reference.

Software for implementing MACs is commercially available. One source is Counterpane Systems, 101 E. Minnehaha Parkway, Minneapolis, Minn., USA.

In addition, the following publications describe various MAC approaches. These articles are hereby incorporated by reference. ANSI X9.9 (Revised), "American National Standard for Financial Institution Message Authentication (Wholesale)," American Bankers Association, 1986.

ANSI X9.19, American National Standard for Retail Message Authentication," American Bankers Association, 1985.

D. W. Davies, "A Message Authentication Algorithm Suitable for a Mainframe Computer," *Advances in Cryptology: Proceedings of Crypto* 82, Plenum Press, 1983, pp. 89-96.

D. W. Davies and W. L. Price, "The Application of Digital Signatures Based on Public-Key Cryptosystems," *Proceedings of the Fifth International Computer Communications Conference*, October, 1980, pp. 525-530.

D. W. Davies and W.L . Price, "Digital Signature-An Update," *Proceedings of International Conference on Computer Communication*, Sydney, October 1984, North Hollan-d:Elsevier, 1985, pp. 843-847.

G. Garon and R. Outerbridge, "DES Watch: An Examination of the Sufficiency of the Data Encryption Standard for Financial Institution Information Security in the 1990's," *Cryptologia*, v. 15, n. 3, July, 1991, pp. 177-193.

M. Girault, "Hash-Functions Using Modulo-N Operations," *Advances in Cryptology-EUROCRYPT '87 Proceedings*, Springer-Verlag, 1988, pp. 217-226.

ISO DIS 8731-1, "Banking-Approved Algorithms for Message Authentication—Part 1: DEA," Association for Payment Clearing Services, London, 1987.

ISO DIS 8731-2, "Banking-Approved Algorithms for Message Authentication—Part 2: Message Authenticator Algorithm," Association for Payment Clearing Services, London, 1987.

ISO/IEC 9797, "Data Cryptographic Techniques—Data Integrity Mechanism Using a Cryptographic Check Function Employing a Block Cipher Algorithm," International Organization for Standardization, 1989.

ISO DIS 10118 DRAFT, "Information Technology-Security Techniques-Hash Functions," International Organization for Standardization, 1989.

ISO DIS 10118 DRAFT, "Information Technology-Security Techniques-Hash Functions," International Organization for Standardization, April 1991.

R. R. Jueneman, "Analysis of Certain Aspects of Output-Feedback Mode," *Advances in Cryptology: Proceedings of Crypto* 82, Plenum Press, 1983, pp. 99-127.

R. R. Jueneman, "Electronic Document Authentication," *IEEE Network Magazine*, v. 1, n. 2, April 1978, pp. 17-23.

R. R. Jueneman, "A High Speed Manipulation Detection Code," *Advances in Cryptology—CRYPTO '86 Proceedings*, Springer-Verlag, 1987, pp. 327-346.

R. R. Jueneman, S. M. Matyas, and C. H. Meyer, "Message Authentication with Manipulation Detection Codes," *Proceedings of the* 1983 *IEEE Computer Society Symposium on Research in Security and Privacy,* 1983, pp. 733-54.

R. R. Jueneman, S. M. Matyas, and C. H. Meyer, "Message Authentication," *IEEE Communications Magazine,* v. 23, n. 9, September 1985, pp. 29-40.

X. Lai, R. A. Rueppel, and J. Woollven, "A Fast Cryptographic Checksum Algorithm Based on Stream Ciphers," *Advances in Cryptology—AUSCRYPT '92 Proceedings,* Springer-Verlag, 1993, pp. 339-348.

J. Linn, "Privacy Enhancement for Internet Electronic Mail: Part I—Message Enciphering and Authentication Procedures," RFC 1040, January, 1988.

K. Ohta and M. Matsui, "Differential Attack on Message Authentication Codes," *Advances in Cryptology—CRYPTO '93 Proceedings,* Springer-Verlag, 1994. pp. 200-223.

Open Shop Information Services, *OSIS Security Aspects,* OSIS European Working Group, WGI, final report, October, 1985.

B. Preneel, "Analysis and Design of Cryptographic Hash Functions," Ph.D. dissertation, Katholieke Universiteit Leuven, January, 1993.

Research and Development in Advanced Communication Technologies in Europe, *RIPE Integrity Primitives: Final Report of RACE Integrity Primitives Evaluation,* (R1040), RACE, June, 1992.

Standards Association of Australia, "Australian Standard 2805.4 1985:

Electronic Funds Transfer—Requirements for Interfaces: Part 4—Message Authentication," SAA, North Sydney, NSW, 1985.

R. Taylor, "An Integrity Check Value Algorithm for Stream Ciphers," *Advances in Cryptology—CRYPTO '93 Proceedings,* Springer-Verlag, 1994, pp. 40-48.

G. Tsudik, "Message Authentication with One-Way Hash Functions," *ACM Computer Communications Review,* v. 22, n. 5, 1992, pp. 29-38.

Therefore, in this form of the invention, a document, such as a photograph, is carried by the PDA. The document may, or may not, be encrypted. The document is accompanied by a MAC.

Processing the document according to a specific algorithm, which is the equation given above in the simplified example, and comparing the result with the MAC will ascertain validity of the document.

Third Form of Invention

The Inventors have deduced that the identification procedure described above may be viewed as involving (1) transporting a document (the digitized photograph) from a trusted source to the security station S and (2) verifying, at the station S, whether the document has been altered.

The Inventors have further deduced that a smart card involves similar operations. That is, (1) at a kiosk, such as an Automated Teller Machine (ATM), data is loaded into the smart card which represents a monetary amount. That data corresponds to the document described above. Then (2) the smart card is transported to a merchant, who corresponds to the security station S in FIG. 4.

The merchant (3) ascertains validity of the data, and then (4) deducts a purchase amount from the data. The merchant finally (5) writes new data to the smart card, representing a new monetary balance resulting after the deduction. The owner of the smart card then proceeds to another merchant, where the process is repeated.

These steps can, conceptually, be reduced to a single pair events: (1) receipt of a document (ie, data representing a monetary amount) from a kiosk and (2) transport of the document to a merchant.

After the transaction with the merchant occurs, these two steps are repeated. That is, the merchant replaces the document with a new document, which the owner of the smart card tranports to another merchant.

From this perspective, both (1) the owner of the PDA 5 in FIG. 2 and (2) the owner of the smart card (not shown) act as couriers. Each courier carries a document from one party to another, namely, from an originating party to a destination party.

The destination party generates a new document, thereby becoming an originating party, and delivers it to the courier. The courier repeats the process, in carrying the document to another party.

With this perspective, the MAC-process described above can be used to replace a collection of smart cards. The collection of smart cards is replaced by a single PDA. That is, under this form of the invention, the document 17 in FIG. 2 is replaced by several documents 17A. Each document contains data indicating a monetary amount.

In addition, the MAC 25 is replaced by multiple MACs 25A, one for each document 17A.

In effect, multiple smart cards are now contained within the PDA, but the physical smart cards are absent. When a transaction is to be undertaken, the document 17A corresponding to a smart card is authenticated, and the transaction is executed. If the transaction results in an alteration of a monetary amount stored in a document 17A, the document is replaced by a new document, containing the new amount, and the corresponding MAC 25A is also replaced.

In addition, the document may be "padded" with additional characters, in order to lengthen the message. For example, the message may contain 5,000 monetary amounts. By pre-arrangement, the actual monetary amount is the 4,999th. The rest act as padding.

In this form of the invention, the security station S in FIG. 4 is equipped with multiple algorithms 120A, each corresponding to a document 17A in FIG. 2. Each document 17A contains a code which identifies its algorithm. Alternately, the computer 100 in FIG. 4 may use every algorithm to compute a MAC, and ascertain whether one of those MACs matches a MAC 25A in FIG. 2.

For example, assume four algorithms 120 in FIG. 4, four smart cards 17A in FIG. 2, and four MACs 25A. When a transaction occurs, the computer 100 in FIG. 4 receives a single document 17A. It computes four MACs, using the four algorithms 120. It compares the four MACs with the four MACS 25A in FIG. 2. If one match occurs, authentication is presumed.

ADDITIONAL CONSIDERATIONS

1. As explained above, a PDA, in general, contains a subset of the components of a portable personal computer. That subset may be a complete subset: the PDA and the computer may be functionally identical.

Perhaps the most common subset contains these elements: a processor; system memory, which includes program memory which stores running programs; a storage medium, such as a fixed disc, for storing programs while not running; stored programs within the storage medium; an input device, such as a keyboard, keypad, or pointing device; and a display.

In general, personal computer in question is the general-purpose, programmable, electronic digital computer. One such computer is that using the architecture designed around the 8xx86 series of microprocessors manufactured by Intel Corporation, Santa Clara, Calif. In one form of the invention, the PDA contains a subset of components which equips it with the characteristics just mentioned: it is programmable, in the sense that it can run programs. A user selects a program, and orders the PDA to run it. It is general-purpose, in the sense that it can perform generalized computation. In contrast, a decoder for a digital satellite television system may contain a computer, and may run programs. However, it is not of the general-purpose type: it cannot run generalized programs.

2. Many smart cards are powered by external sources. That is, they do not carry storage batteries or solar cells, and are powered by the stationary equipment with which they communicate. Consequently, while they are stored in a user's purse or wallet, this type of card remains dormant and unpowered. In contrast, the PDA is self-powered.

3. In one form of the invention, one of the documents 17A in FIG. 2 may contain a photograph. A corresponding MAC 25A is also provided. The remaining documents 17A are smart cards. In this form of the invention, authentication of a photograph identifying a party is provided. That party uses smart cards 17A to execute financial transactions.

4. This point provides one definition of the term "authenticate."

The invention is used to authenticate digital documents. In one embodiment, as explained above, the invention determines whether the MAC "matches" the digital document. Specifically, the invention determines whether the document, when processed by a test algorithm, such as the equation given above, produces a MAC which matches that accompanying the document. If so, authenticity is taken as proven.

The proof lies in the inference that the "test" algorithm is identical to that used by the originator of the document. The reason for the inference is that both algorithms produce the same MAC, when fed the same input, namely, the document.

Restated, the production of the correct MAC by the "test" algorithm indicates that the document-MAC pair originated with a party in possession of an identical algorithm.

If a group of two, or more, parties generate an appropriately complex algorithm and share it, the testing scenario just described will prove whether the document in question originated from one of the parties. Thereby, proof is attained that the document originated with a party in possession of the algorithm. That is taken as proof of the origin of the document, and also of its authenticity. The proof is authentication of the document.

This proof is not rebutted by dishonesty of one of the parties. For example, a party may sell the algorithm to a thief. Even if so, the testing procedure described above still proves whether the document originated with a party in possession of the algorithm, even if that party be a thief.

Restated in simpler terms: the invention identifies a class of parties from which the document originated, thereby authenticating the document.

5. In one form of the invention, no independent verification of the document 17 in FIG. 2 occurs. That is, ordinarily, when a person executes a transaction with an ATM, the ATM contacts the person's bank, to verify whether the person maintains an account at the bank, and whether the account contains funds sufficient to cover the transaction.

However, under this form of the invention, no such verification occurs. This absence of verification is indicated by the parenthetical in block 89 in FIG. 3. Restated, the security computer 100 in FIG. 4 makes no contact with a third party in connection with the transaction involving a document 17 in FIG. 2. That lack of contact exists whether the document is involved in a financial transaction, or an identification transaction.

Of course, in other forms of the invention, third-party involvement may be used.

6. For simplicity of explanation, much of the preceding discussion focused upon traditional uses of smart cards. The invention contemplates the use of smart cards for the transfer of all types of personal and privacy data which are transferred between a smart card holder and another agent involved in a transaction, such as a kiosk.

7. Specific data links between the invention and the kiosk, or other agent, were discussed above. However, it should be recognized that the type of link is not necessarily important, and that different links, even links which are not yet developed, can be used.

8. A significant aspect is that a person utilizing the invention need not enter certain required data at the time of the transaction. That data is stored within the invention, and is delivered by the invention, without entry by the person at the time of transaction. In addition, this type of delivery keeps the data secret, since the data is not exposed to external view, as would be key-presses, but is carried by the data link, in a concealed manner.

Numerous substitutions and modifications can be undertaken without departing from the true spirit and scope of the invention. What is desired to be secured by Letters Patent is the invention as defined in the following claims.

What is claimed is:

1. An apparatus, comprising:
   a) a Personal Digital Assistant, PDA;
   b) a digital document received from a first party, stored within the PDA, the digital document comprising a photograph of a person authorized to use the PDA; and
   c) a Message Authorization Code, MAC, received from the first party and stored within the PDA, which is effective to repeatedly identify, at different places and times, the source of said digital document to a second party in possession of a predetermined test algorithm and a copy of the digital document and MAC received from the PDA and where the photograph from the digital document is compared to a person to authenticate authorization of the person to use the PDA.

2. Apparatus according to claim 1, wherein the MAC is unique to said digital document.

3. Apparatus according to claim 1, wherein the digital document is stored in read-only memory.

4. Apparatus according to claim 1, wherein the digital document further comprises financial information; and wherein using the PDA comprises executing financial transactions using the digital document by the authenticated person.

5. Apparatus according to claim 1, wherein the digital document represents money and is accepted as money at terminals which include one or more of the following: point-of-sale terminals, self-service kiosks, and automated teller machines.

6. Apparatus according to claim 5, and further comprising:
   d) means which enables the PDA to spend the money at terminals which accept payment from smart cards.

7. Apparatus according to claim 1, wherein the digital document represents money and further comprising:
   d) means for spending the money at terminals which accept payment from smart cards.

8. A method of processing digital cash, comprising the following steps:

a) from an external source, providing a digital document to a PDA where the digital document comprises a photograph of a person authorized to use the PDA;
b) at the external source, applying an algorithm to the digital document, to produce a Message Authentication Code, MAC;
c) providing the MAC to the PDA;
d) storing the MAC and digital document in the PDA; and
e) making the MAC and the digital document stored in the PDA available at different times to parties seeking to validate the digital document and using the photograph to authenticate the person using the PDA.

9. The method of processing digital cash according to claim 8, wherein the digital document further comprises financial information; and
where the method further comprises the step of:
executing financial transactions using the digital document by the authenticated person.

10. The method of processing digital cash according to claim 8, wherein the digital document represents money and is accepted as money at terminals which include one or more of the following: point-of-sale terminals, self-service kiosks, and automated teller machines.

11. The method of processing digital cash according to claim 10, further comprising the step of:
f) using the PDA, spending the money at terminals which accept payment from smart cards.

12. The method of processing digital cash according to claim 8, wherein the digital document represents money, the method further comprising the step of:
f) spending the money at terminals which accept payment from smart cards.

* * * * *